J. F. NETTLE.
RESILIENT WHEEL.
APPLICATION FILED NOV. 7, 1913.
1,163,443.
Patented Dec. 7, 1915.
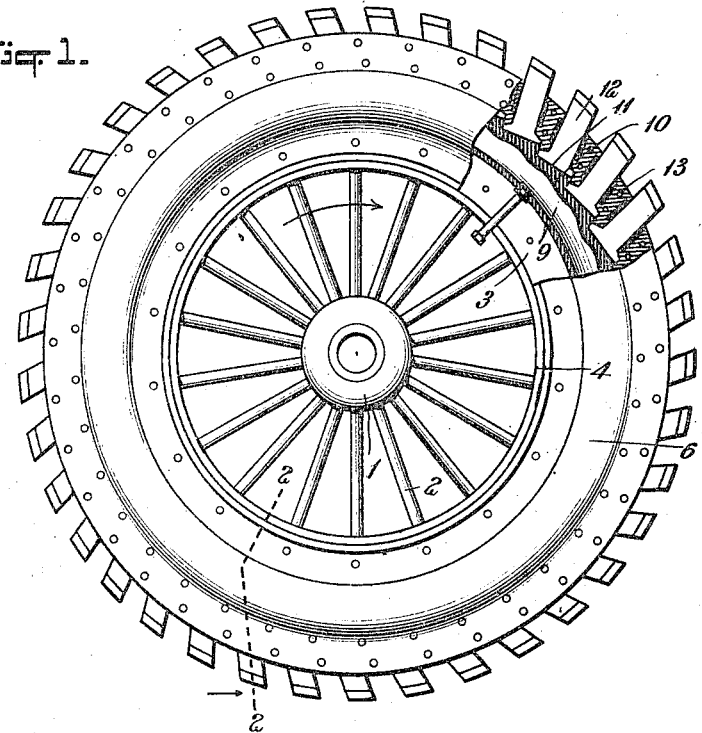
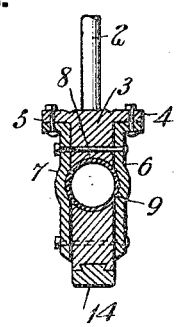
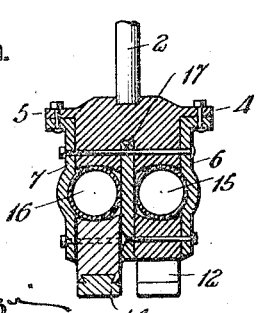
WITNESSES
INVENTOR
John F. Nettle
BY
ATTORNEYS

UNITED STATES PATENT OFFICE.

JOHN F. NETTLE, OF BUTTE, MONTANA.

RESILIENT WHEEL.

1,163,443.

Specification of Letters Patent. Patented Dec. 7, 1915.

Application filed November 7, 1913. Serial No. 799,683.

*To all whom it may concern:*

Be it known that I, JOHN F. NETTLE, a citizen of the United States, and a resident of Butte, in the county of Silverbow and of Montana, have invented a new and Improved Resilient Wheel, of which the following is a full, clear, and exact description.

This invention relates to improvements in resilient wheels, and has for an object to provide a wheel which retains the characteristics of a wheel provided with a pneumatic tire while presenting means to the earth or road bed which cannot be punctured or readily injured.

Another object of the invention is to provide a resilient wheel with an annular pneumatic tube, and with a plurality of reciprocating contact members substantially radiating from the tube, whereby the tube does not at any time come in contact with the ground, and the various reciprocating members are permitted independent movement.

In carrying out the object of the invention a wheel structure of substantially any form may be provided. On the wheel structure is arranged a specially constructed felly which carries a pneumatic tube, and also a pair of side plates for holding the tube properly in place. Arranged between the side plates are contact members which reciprocate, the movement being at a tangent. These contact members are arranged in the form of plungers with one end bearing against the pneumatic tube, whereby each contact member is independent in its movement, and may be compressed without affecting the next adjacent contact member. By these means when the wheel is in use any small obstruction, as for instance a stone may be passed over without causing any appreciable jolt or jar as the particular contact member engaging the same will be depressed, while the remaining contact members will be engaging the surrounding earth. The contact members are caused to move at a tangent, preferably, so as to give a slight pushing action during the rotation of the wheel and thereby give out some of the energy stored therein when the pneumatic tube is compressed by the contact members.

In the accompanying drawing—Figure 1 is a side view of a wheel embodying the invention, certain parts being broken away for better illustrating the construction; Fig. 2 is a section through Fig. 1 on line 2—2; Fig. 3 is a section similar to Fig. 2, but disclosing a slightly modified form of the invention.

Referring to the accompanying drawing by numeral 1 indicates a hub, and 2, spokes connected with the hub, and with a felly 3. The felly 3 is formed with flanges 4 and 5 for receiving the flanges of side plates 6 and 7, whereby the side plates may be bolted to the flanges 4 and 5 as shown in Fig. 2. Fig. 3 is also provided with a grooved portion 8 in which a pneumatic tube 9 is placed. Pneumatic tube 9 is formed with shouldered portions 10 against which the enlarged faces 11 of the contact members 12 rest, whereby the pressure from the contact members is distributed over an appreciable area. The various contact members 12 are held in place by suitable blocks 13 bolted or otherwise rigidly secured to the side plates 6 and 7. These blocks limit the outward movement of the members 12 but permit the members 12 to move inwardly substantially any distance within the limits of the size of the pneumatic tube 9. Anti-friction members are provided in members 13 so as to make the contact members 12 move freely in their back and forth movement. The contact faces of contact members 12 are preferably provided with a shoe 14 formed of metal, rubber, or other suitable material.

In Fig. 3 will be seen a modified form of the invention in which a pair of pneumatic tubes 15 and 16 are provided, the same being spaced apart by a partitioning member 17. A series of contact members 12 are provided for each of the tubes 15 and 16, these contact members being staggered so that the outer surface or periphery of the wheel will be substantially continuous.

What I claim is—

In a resilient wheel of the character described, a felly, a pair of retaining plates rigidly secured to said felly, a pneumatic tube arranged on said felly between said plates, said pneumatic tube being formed with flat shoulder portions, the normal of which would be at a tangent, a plunger resting on each of said shoulders, said plunger being formed with overhanging portions, and means connected with said retaining plates arranged between the respective plungers for holding the plungers spaced apart and guiding the same in a reciprocatory movement.

In testimony whereof I have signed my name to this specification in the presence of two subscribing witnesses.

JOHN F. NETTLE.

Witnesses:
JOHN W. JOHNS,
SAMUEL BARKER, Jr.